Dec. 4, 1951      T. O. SNIDER      2,577,375
AXLE CONTACTOR FOR VEHICLE HOISTS

Filed Dec. 7, 1948      4 Sheets-Sheet 1

INVENTOR.
THEODORE O. SNIDER
BY
Woodling and Krost
attys

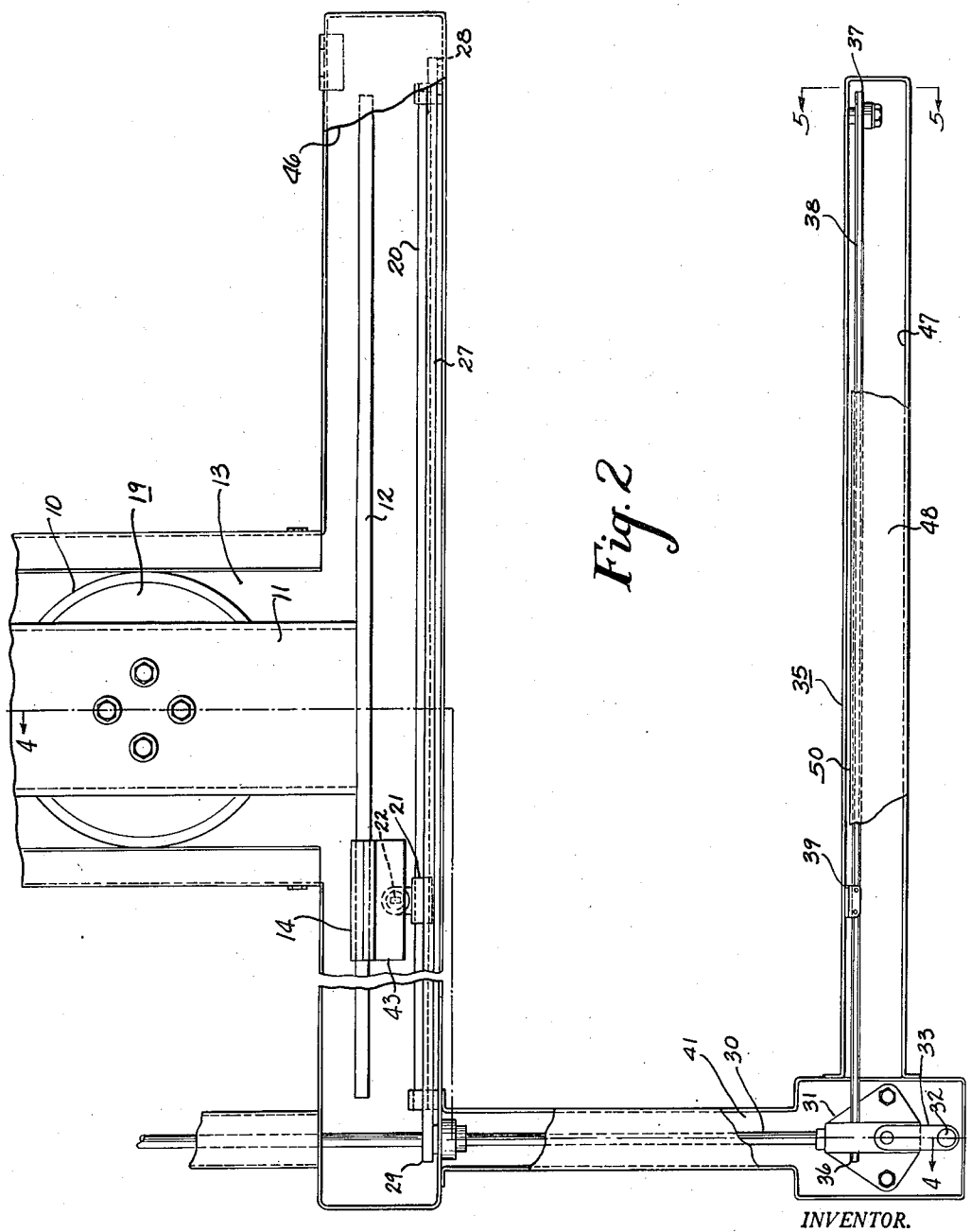

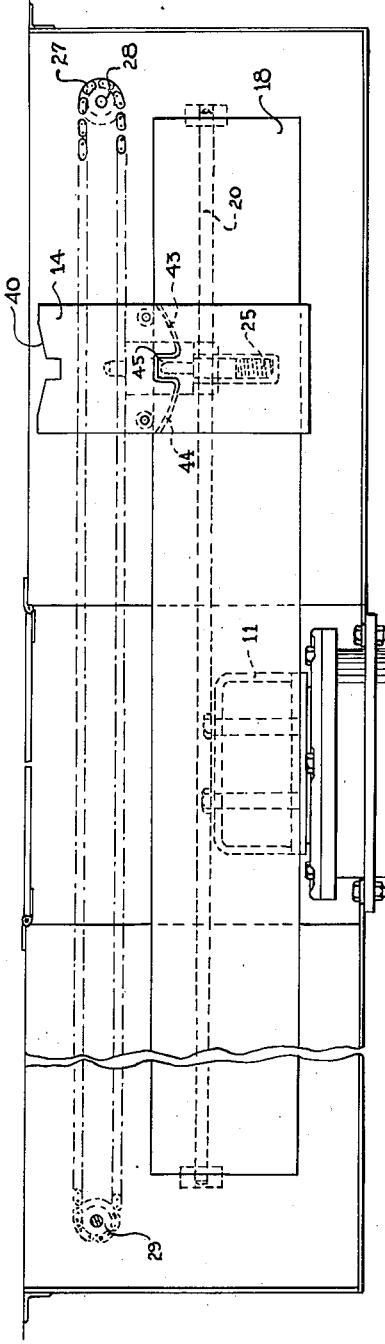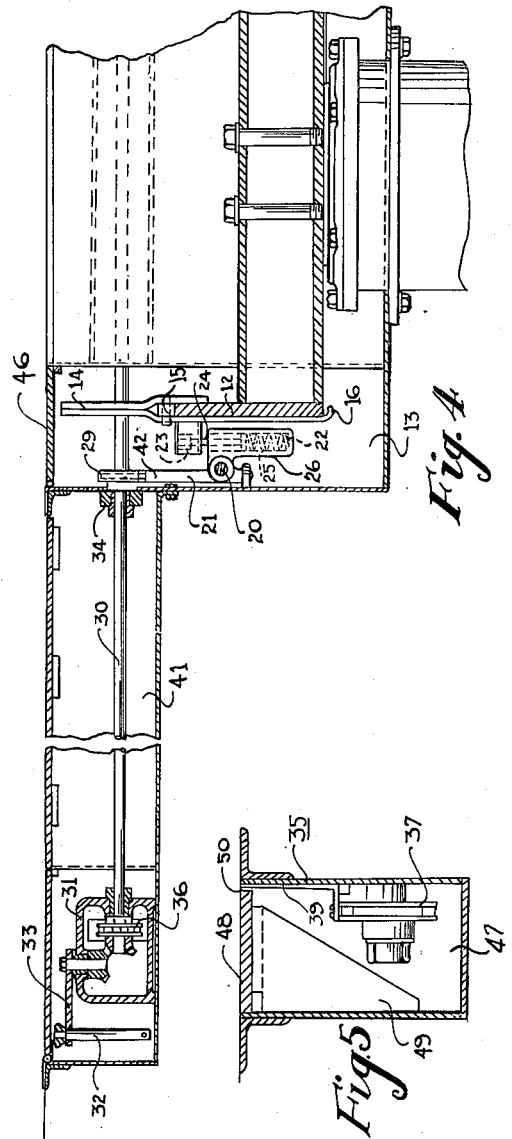

Patented Dec. 4, 1951

2,577,375

UNITED STATES PATENT OFFICE 2,577,375

AXLE CONTACTOR FOR VEHICLE HOISTS

Theodore O. Snider, Cleveland, Ohio, assignor, by mesne assignments, to Harold C. Schott, Cleveland, Ohio Application December 7, 1948, Serial No. 64,016

4 Claims. (Cl. 254—89)

This invention relates to automobile lifts in general, and relates more particularly to a lift which is retractable into a covered pit below floor level and has an adjustable axle contact member thereon, and it relates specifically to a remotely controlled adjustable axle contact member which may be positioned relative to the axle of a vehicle before the lift emerges from the covered pit.

Prior automobile lifts generally consisted of a single hydraulic post and an H-shaped superstructure. The post operated in a cylinder extending into the floor of the service station or garage and the superstructure rested upon the floor. A vehicle to be lifted was driven upon the superstructure and then both the superstructure and the vehicle were lifted off of the floor by the hydraulic post.

Two-post lifts have been developed in which one post is adapted to contact the front axle of a vehicle, and a second post is adapted to contact the rear axle of the vehicle. Many advantages in automotive servicing and repair work are obtainable by a two-post lift. However, a problem immediately arose with two-post lifts which was not apparent in the one-post lift having a large superstructure upon which the vehicle could be driven, and that problem was to make the lift adaptable to vehicles of widely varying wheel bases. That is, the lift, to be of any practical value, must be able to service substantially any make or model of automobile. Further, the modern lift is designed to raise the vehicle by contacting the axle of the vehicle rather than the wheels. Therefore, the superstructure of the modern lift is substantially more narrow than the old type of superstructure having a wide path upon which the wheel of the vehicle was adapted to rest. Because of the narrow width of the superstructure in the modern lift, and because it is desirable to leave the undercarriage of the vehicle as nearly unobstructed by the lifting superstructure as possible, axle contact members are provided on the superstructure of each post in a two-post lift, and the axle contact members on the rear post are shiftable for contacting the rear axle of a vehicle regardless of its position. Therefore, the vehicle is placed with the front axle thereof over the front post of the lift and the shiftable axle contact members are aligned with the rear axle before the rear post of the lift is raised. Thus, by providing the shiftable contact members on one of the posts of a two-post lift, the two-post lift is readily adaptable for any length wheel base vehicle within a predetermined range.

In order to make the lift more valuable, recent developments have been made to provide pits into which the entire lift including the superstructure could withdraw and be covered. Thus the large amount of floor space normally occupied by an automobile lift is available in the modern garage for other purposes when the lift is not being used. The space thus saved is equivalent to an entire supplemental garage in service stations and service garages having numerous lifts. Prior to the present invention, however, the axle contact members provided with two-post lifts were very difficult to align with the axle of the vehicle. As before stated, the modern two-post lift is retracted into a pit which is covered in order that the floor area may be used for other purposes when the lift is retracted. The axle contact member is thus covered and out of sight within the lift pit. Consequently, prior lift devices require the attendant to start the lift in its upward direction until it extends just above the floor level of the pit. Then the attendant uses a long rod or crawls under the car to move the axle contact members into line with the rear axle of the vehicle.

An object of the invention is to provide an improved axle contact member for a vehicle lift.

Another object of the invention is to provide an axle contact member which may be moved with respect to the lift mechanism to adapt the lift for raising vehicles of various wheel base by their axles.

Still another object of the invention is to provide means for adjustably moving the axle contact members of a vehicle lift while the lift is enclosed within a covered pit.

Yet another object of the invention is to provide remote control adjustment means for adjusting the axle contact members of a vehicle lift covered within a floor pit.

A still further object of the invention is to provide remote control handle means a distance from a vehicle lift which is adapted to be covered within a floor pit, and extension means below floor level extending from the control handle means to the pit, the extension means being adapted to be operated by the control handle to move the concealed axle contact members of the lift relative to a vehicle parked over the lift.

A further object of this invention is to provide a single remote control handle adapted to simultaneously move a left and a right-hand axle contact member upon a lift.

Another object of this invention is to provide two spaced axle contact members for a lift, and provide two spaced shuttles each adapted to drivingly engage one axle contact member, and to provide a drive mechanism adapted to simultaneously drive both shuttles relative to said lift and thereby position the two axle contact members by means of one remote control member.

Other objects and a fuller understanding of the invention may be had by referring to the following description and claims, taken in conjunction with the accompanying drawings, in which:

Figure 2 is an enlarged top view of the remote control handle, the indicator, and one of the simultaneously controlled axle contact members of one post of a two-post lift;

Figure 3 is a side view of the superstructure of the lift post illustrated in Figure 2, showing a dolly track with the dolly thereon and a detent member interconnecting the dolly and the axle contact member;

Figure 4 is a cross-sectional view along the line 4—4 of Figure 2;

Figure 5 is a cross-sectional view along line 5—5 of Figure 2; and

The drawings illustrate the preferred embodiment of this invention providing means to adjust the position of axle contact members upon a covered lift while the lift and axle contact members are covered within a lift pit. As previously indicated, the modern two-post lift generally is provided with adjustable axle contact members only upon the rear post, although, if desired, four adjustable axle contact devices could be provided. Therefore, without limiting this invention to any particular number of adjustable axle contact devices, the rear post of a two-post lift is illustrated with right and left adjustable axle contact devices.

Figure 1:
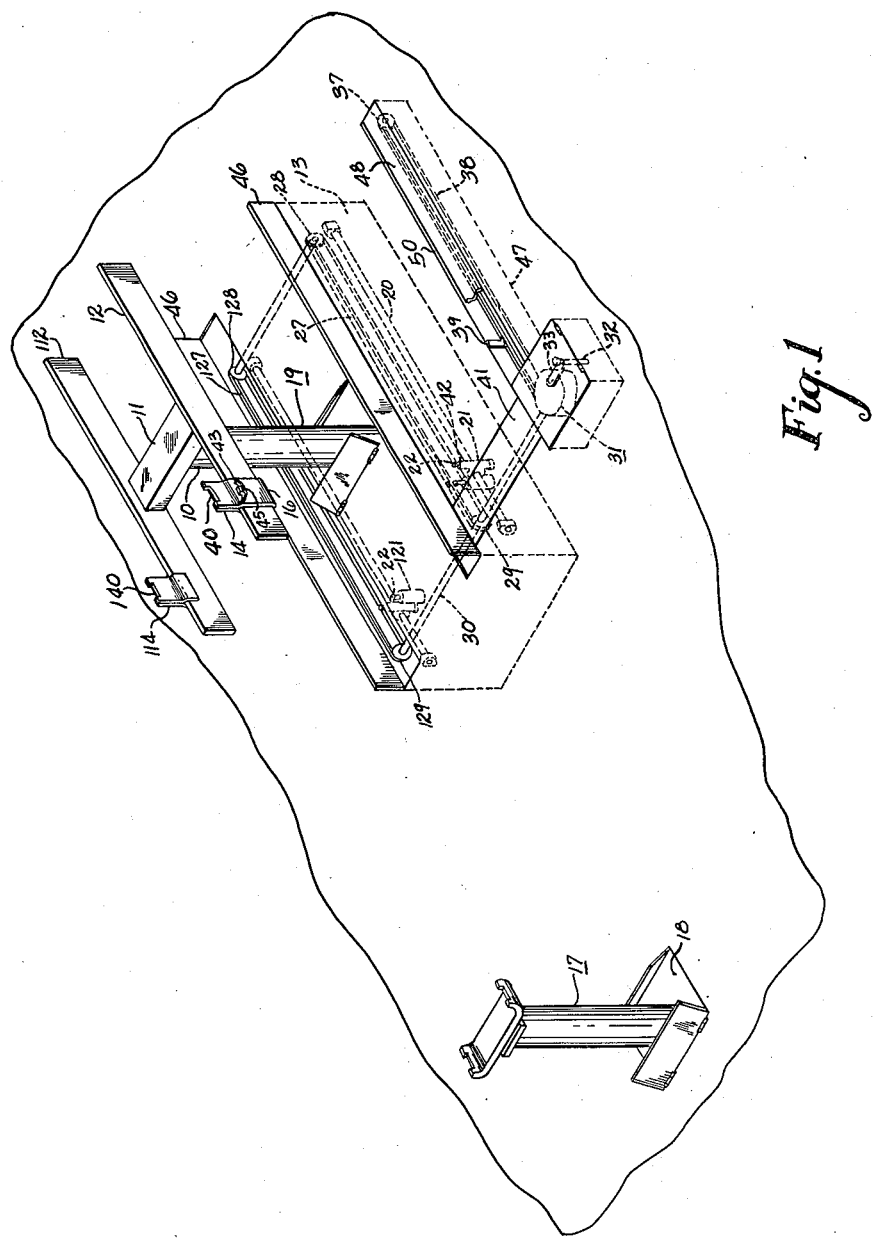
Figure 1 is a perspective view of a two-post lift into which the features of this invention have been incorporated.

In the Figure 1 of the drawing the general plan of a two-post lift is illustrated having a front lift 17 of conventional construction adapted to withdraw into a pit 18, and a rear lift 19 adapted to withdraw into a lift pit 13. The principles of this invention, and an actual embodiment of the invention, are illustrated only in connection with the rear lift 19, because substantially all lifts provided for service stations and garages require only that the rear lift 19 has adjustable axle contact means. Both the front pit 18 and the rear pit 13 may be covered by any suitable means when the post and superstructure thereon are withdrawn into the pit.

The rear lift 19 comprises a hydraulic post 10 of suitable standard design and construction, having a cross member 11 bolted on the end of the post 10, or otherwise suitably attached to the post 10. Two spaced longitudinally extended upright plate members 12 and 112 are attached to the ends of the cross member 11, as best illustrated in the Figures 2 and 4. An axle-engaging block 14 is mounted upon the member 12 and an axle-engaging block 114 is mounted upon the member 112. The axle-engaging blocks 14 and 114 are adapted to shift longitudinally upon the members 12 and 112, and in the particular embodiment illustrated the members 14 and 114 are provided with rollers 15 and 115 to provide easy shifting movement of the axle-engaging blocks, and are provided with hook ends 16 and 116 to prevent the unintentional removal of the axle-engaging blocks from the members 12 and 112. In other words, the axle-engaging blocks 14 and 114 operate somewhat similarly to shuttle trucks which may be shuttled back and forth upon a track. The blocks 14 and 114 are provided with notched upper surfaces, as indicated by the reference characters 40 and 140, to engage the axle of a vehicle.

As previously stated, it is an object of this invention to shift both of the axle-engaging blocks 14 and 114 upon the upright plate members 12 and 112 simultaneously from a remote spot from the pit 13 in order that a car or other vehicle may be driven over the lift and the axle-engaging blocks 14 and 114 moved to the proper position to contact the axle of the vehicle before the post 10 is started in its upward direction. In the preferred embodiment of this invention the axle-engaging blocks 14 and 114 on the two spaced members 12 and 112 are shifted by means of an extension arm shaft 30 simultaneously driving two dolly members 21 and 121. The shaft 30 extends laterally with respect to the pit 13 at the ends of the members 12 and 112, and extends through a tunnel 41 below the floor surface to a transmission assembly 31 located a suitable distance from the pit 13. The transmission assembly includes a spoke arm 33 and a retractable and extensible handle 32. The handle 32 is adapted to drop through an opening in the spoke arm 33 when not in use, and therefore may be covered over within the tunnel 41, and may be pulled up to rotate the spoke arm 33 and drive the transmission device to turn the extension arm shaft 30. Bearings 34 are provided to properly align the shaft 30 and provide smooth easy turning of the shaft.

Track members 20 and 120, which are illustrated as being round rods, extend longitudinally beside the members 12 and 112 within the pit 13. The dollies 21 and 121 are each provided with a circular opening therethrough to receive the tracks 20 and 120, and therefore they may be longitudinally shifted along the tracks 20 and 120 beside the plate members 12 and 112. The dollies 21 and 121 each include a drive portion 42 and a detent portion 22. The detent portion includes a tubular receptacle 26 adapted to hold a coil spring 25. A plunger 24 is provided with a roller 23 on the ends thereof, and fits into the tubular receptacle portion 26 against the spring 25. Therefore, the roller 23 may be pressed downwardly and will force the plunger 24 against the spring 25. The roller 23 is therefore retractable by force, but will be moved out of the tubular receptacle portion 26 by the spring 25 when the force is released.

Figure 6:
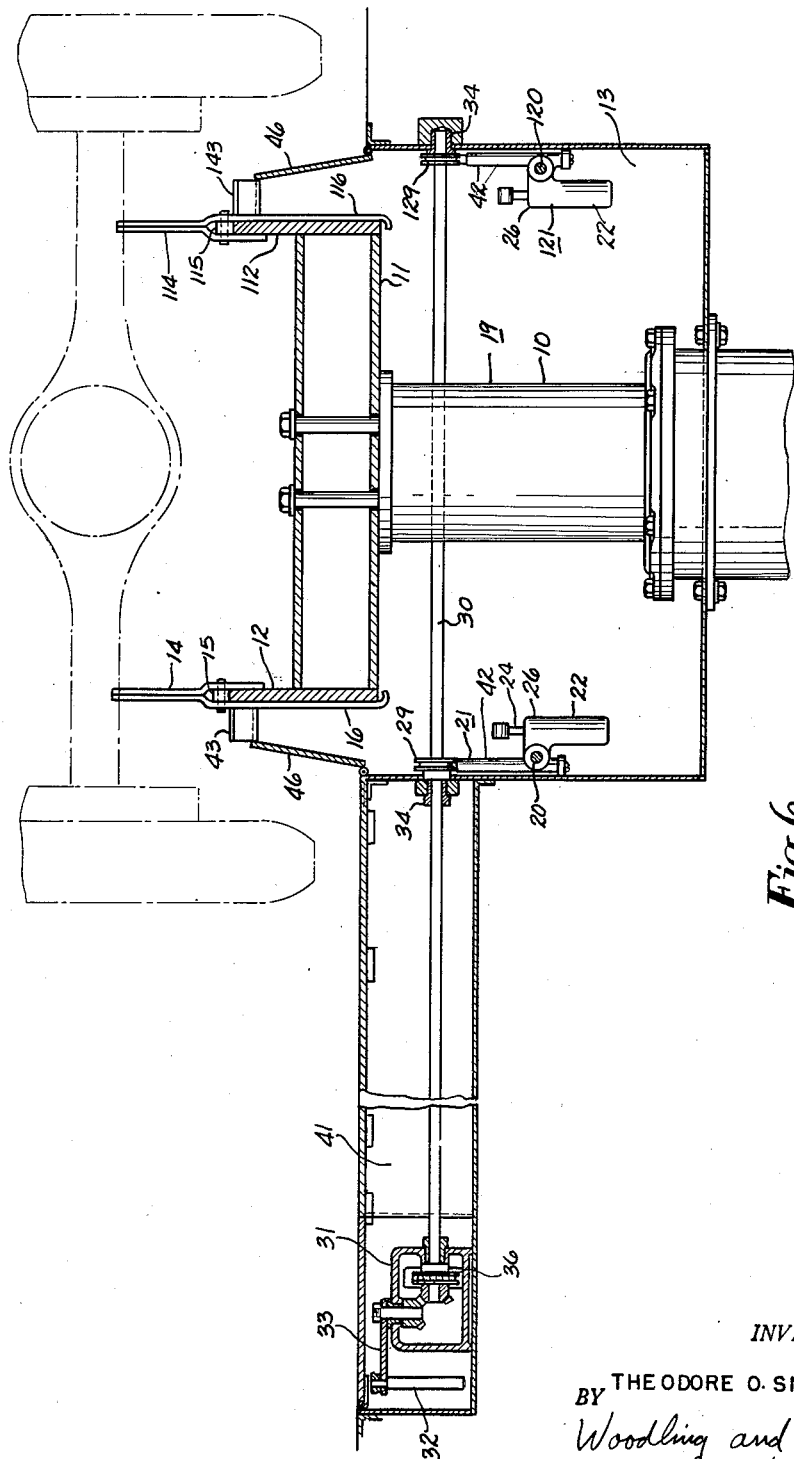
Figure 6 is a view similar to Figure 4 showing a full cross section to illustrate both longitudinally extending upright plate members with the axle-engaging blocks thereon and the relationship of the adjusting members with respect to the lift pit, the lift being raised with the axle-engaging blocks in contact with the axle of a vehicle.

The axle-engaging blocks 14 and 114 each have a catch member 43 and 143 respectively on the side thereof as best illustrated in the Figures 3 and 6. Referring only to block 14 for illustration, the catch member 43 has two tapered side portions 44 and a central recess 45. The catch member 43 extends outwardly from the side of the member 14 toward the dolly 21, and the detent 22 extends outwardly from the side of the dolly 21 toward the axle-engaging block 14. Therefore, the catch member 43 is positioned to pass over the top of the tubular receptacle portion 26 of the dolly 21 and the detent 22 is adapted to pass under the catch member 43. Consequently, if the dolly 21 is moved in an attempt to make the dolly 21 pass the axle-engaging blocks 14, the roller 23 will contact one or the other of the tapered sides 44 of the catch 43 and will be depressed against the urge of the spring 25 until the roller becomes aligned with the recess 45, and then the roller 23 will snap up into the recess 45. Thereafter, any movement of the dolly 21 will cause the block member 14 to move therealong. In other words, the dolly 21 and the axle-engaging block 14 will be interlocked or interconnected and will be moved as a unit.

The shaft 30 is provided with two spaced drive sprockets 29 and 129 as illustrated in Figure 6. Two idle sprockets 28 and 128 are provided at the opposite end of the pit 13 from the sprockets 29. A drive chain 27 is looped around the sprocket 29 and the sprocket 28, and a drive chain 127 is looped around the sprocket 129 and the sprocket 128. The chains 27 and 127 are fastened to the dollies 21 and 121 by any suitable means, such for example, as by extending a screw through one length of the chain into the dolly, and therefore movement of the chains around the sprockets by rotation of the shaft 30 and sprockets 29 and 129 will shift the dollies 21 and 121 in either direction upon the tracks 20 and 120. Rotation of the chains upon the sprockets is accomplished by driving the chains 27 and 127 by any suitable remotely operated means, and in the preferred mechanical embodiment illustrated, by rotation of the handle 32 of the transmission assembly 31 to drive the extension arm shaft 30. Thus, the position of the dollies 21 and 121 is controlled at the transmission assembly 31 which is located a distance from the pit 13.

The operation of this embodiment of the invention to position the axle-engaging blocks 14 and 114 is quite simple. The operator uncovers the transmission assembly 31 and pulls the extendable handle 32 to a convenient working height. By rotating the handle 32 about the assembly 31, the operator is able to rotate the shaft 30 in either direction. Rotation of the shaft 30 will cause the chain 27 and 127 to run around between the sprockets 28 and 29 and sprockets 128 and 129, and shift the dollies 21 and 121 upon the tracks 20 and 120. When the dollies attempt to pass the axle-engaging blocks, the rollers of the detents become interlocked into the recesses 45 of the catches 43, and thereafter the axle-engaging blocks 14 and 114 may be moved with the dolly members 21 and 121 by rotation of the handle 32.

As previously stated, it is desired to move the axle-engaging blocks while the blocks remain covered within a closed pit. In the Figures 1, 4 and 6, the pit is illustrated as being covered by doors or cover plates 46, but any suitable or conventional method of covering the pit 13 may be employed. The tunnel 41 is also covered by a suitable cover means substantially flush with the floor level. Therefore, when the hydraulic post 10 is retracted, the entire lift with its superstructure including the axle-engaging blocks 14 and 114, and the entire position-adjusting means is below the surface of the floor and permits the entire floor surface to be used when the lift is out of service. Therefore, in order to indicate to the operator the position of the notches 40 in the axle-engaging blocks 14 and 114, an improved indicator device 35 is provided. The indicator device 35 comprises a sprocket 36 mounted on the extension arm shaft 30 for rotation therewith, and a sprocket 37 spaced a distance from the sprocket 36 at least equal in length to the length of the plate members 12 and 112. The indicator device 35 is best illustrated in relation to the lift in the Figure 2 of the drawing. The sprocket 36, of course, is below the surface of the floor in the tunnel 41, and a longitudinal tunnel 47 is provided extending substantially parallel to the plate member 12 a spaced distance therefrom as illustrated in the Figure 2. The sprocket 37 is below the surface of the floor at the end of the tunnel 47. An endless chain 38 extends around the sprockets 36 and 37 and will move with a linear speed and direction equal to the movement of the chains 27 and 127. The tunnel 47 is provided with a suitable cover 48 and a cover brace 49, and covers all of the tunnel except a small longitudinal slot 50 extending the length of the cover 48. A pointer 39 is secured to the chain 38 laterally opposite from the position of the dolly 21 on the chain 27. Therefore, the pointer 39 will indicate the exact position of the dolly 21, and after the detent 22 has become engaged with the axle-engaging block 14, the pointer 39 will indicate the exact position of the block 14. The block 114 will move simultaneously with the block 14, because the chains 27 and 127 are both driven by the shaft 30, and therefore the pointer 39 indicates the position of both blocks 14 and 114. The operator may then longitudinally shift the axle-engaging blocks 14 and 114 until the pointer 39 indicates that the notches 40 are substantially aligned with the axle of the vehicle to be lifted. The operator need not stop the lift in its upward motion to adjust the position of the axle-engaging blocks 14 and 114, and will thus save the time and bother of looking under the car to adjust the position of the blocks.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A vehicle lift structure comprising, a lift pit, a vehicle lift having a superstructure, said superstructure having longitudinally shiftable axle contact means mounted thereon, drive means mounted in said pit, said drive means including interconnection means adapted to engage said axle contact means upon contact therewith and release said axle contact means upon vertical lifting of the axle contact members away from the interconnection means, a shift control station located a distance from said pit, and control transmission means linking said shift control station to said drive means in said pit.

2. A vehicle lift structure comprising, a lift pit, a vehicle lift having a superstructure, said superstructure having longitudinally shiftable axle contact means mounted thereon, drive means mounted in said pit, said drive means including interconnection means adapted to engage and move said axle contact means in a longitudinal path on said superstructure, an indicator pit extending in a lateral path a distance from said lift pit, indicator carriage means mounted for longitudinally reciprocal movement in said indicator pit, an indicator carried by said carriage visible above floor level, indicator carriage drive means, a shift control station located a distance from said lift pit, and control transmission means linking said drive means in said pit and said indicator carriage drive means with said control station in synchronized relationship for laterally aligned simultaneous movement of the interconnection means and the indicator carriage.

3. A vehicle lift structure comprising, a lift pit, a vehicle lift having a superstructure, said superstructure having longitudinally shiftable axle contact means mounted thereon, drive means mounted in said pit, a track member in said lift pit extending substantially parallel to the path of longitudinal movement of the axle contact means, a dolly member mounted to ride said track, drive means operably connected to drive said dolly in a reciprocable path, a shift control station located a distance from said pit, control transmission means linking said shift control station to said drive means, detent means releasably interconnecting said dolly with said axle contact means upon movement of the dolly to the position of the axle contact member, the axle contact means and dolly after engagement being movable together as a unit, whereby the axle contact means may be moved to a selected position relative to said lift by operation of the shift control station.

4. A vehicle lift structure comprising, a lift pit, a vehicle lift having a superstructure, said superstructure having longitudinally shiftable axle contact means mounted thereon, drive means mounted in said pit, a looped belt drive track member in said lift pit extending substantially parallel to the path of longitudinal movement of the axle contact means, a dolly member mounted on said track, drive means operably connected to drive said track in a reciprocable path, a drive crank station located a distance from said pit, transmission means linking said drive crank station to said drive means, detent means releasably interconnecting said dolly with said axle contact means upon movement of the dolly to the position of the axle contact member, the axle contact means and dolly after engagement being movable together as a unit, whereby the axle contact means may be moved to a selected position relative to said lift by operation of the drive crank.

THEODORE O. SNIDER.

REFERENCES CITED

The following references are of record in the file of this patent:

UNITED STATES PATENTS

| Number | Name | Date |
|---|---|---|
| 1,849,777 | Weaver | Mar. 15, 1932 |
| 1,889,185 | Stukenborg | Nov. 29, 1932 |
| 2,015,357 | Weaver | Sept. 24, 1935 |
| 2,091,067 | Engh | Aug. 24, 1937 |
| 2,120,051 | Tully | June 7, 1938 |
| 2,423,954 | Thompson | July 15, 1947 |
| 2,424,673 | Thompson | July 29, 1947 |